(12) United States Patent
Meunier et al.

(10) Patent No.: US 10,509,180 B2
(45) Date of Patent: Dec. 17, 2019

(54) FLEXIBLE ROUTING IN A FIBER TRAY FOR USE IN A FIBER OPTIC ASSEMBLY

(71) Applicant: Ciena Corporation, Hanover, MD (US)

(72) Inventors: Trevor Meunier, Kemptville (CA); Mitchell O'Leary, Ottawa (CA); Victor Aldea, Ottawa (CA)

(73) Assignee: Ciena Corporation, Hanover, MD (US)

( * ) Notice: Subject to any disclaimer, the term of this patent is extended or adjusted under 35 U.S.C. 154(b) by 51 days.

(21) Appl. No.: 15/891,449

(22) Filed: Feb. 8, 2018

(65) Prior Publication Data
US 2019/0243077 A1 Aug. 8, 2019

(51) Int. Cl.
*G02B 6/38* (2006.01)
*G02B 6/44* (2006.01)

(52) U.S. Cl.
CPC ......... *G02B 6/3897* (2013.01); *G02B 6/3887* (2013.01); *G02B 6/444* (2013.01)

(58) Field of Classification Search
CPC .. G02B 6/4452; G02B 6/3897; G02B 6/4446; G02B 6/4455; G02B 6/4457; G02B 6/4454; G02B 6/4466; G02B 6/4471; G02B 6/44; G02B 6/4441; G02B 6/4442; G02B 6/445; G02B 6/4459; G02B 6/4472; G02B 6/4477
See application file for complete search history.

(56) References Cited

U.S. PATENT DOCUMENTS

| | | | | |
|---|---|---|---|---|
| 5,757,997 A * | 5/1998 | Birrell | ................... | B08B 7/0028 385/60 |
| 5,836,031 A * | 11/1998 | Cox | ....................... | B08B 7/0028 15/104.002 |
| 6,327,507 B1 * | 12/2001 | Buchan | .................... | A61N 1/02 191/12.4 |
| 6,741,784 B1 * | 5/2004 | Guan | .................... | G02B 6/4471 385/135 |
| 7,715,679 B2 * | 5/2010 | Kowalczyk | .......... | G02B 6/3897 385/135 |
| 8,060,397 B2 * | 11/2011 | Neumaier | .......... | G06Q 10/0635 705/7.28 |
| 9,063,316 B2 * | 6/2015 | Loeffelholz | .......... | G02B 6/4441 |
| 9,678,292 B2 * | 6/2017 | Landry | ............... | G02B 6/4452 |
| 9,851,524 B2 * | 12/2017 | Vongseng | ............ | G02B 6/4455 |
| 10,274,692 B2 * | 4/2019 | Abbiati | ............... | G02B 6/3897 |
| 2017/0276893 A1 * | 9/2017 | Geling | ................ | G02B 6/4452 |
| 2018/0136422 A1 * | 5/2018 | Alexi | .................. | G02B 6/4452 |

* cited by examiner

*Primary Examiner* — Ryan A Lepisto
*Assistant Examiner* — Erin D Chiem
(74) *Attorney, Agent, or Firm* — Clements Bernard Walker; Christopher L. Bernard; Lawrence A. Baratta, Jr.

(57) ABSTRACT

A fiber tray with an adjustable fiber boot exit angle includes one or more trays each including a base layer and a retention mechanism for one or more optical fibers at various positions about the base layer, wherein the one or more trays provide management of the one or more optical fibers in a fiber optic assembly; a fiber boot at an exit point of a tray of the one or more trays, wherein the fiber boot provides an exit for the one or more optical fibers from the fiber tray; and an adjustment mechanism configured to adjust an exit angle of the one or more optical fibers by changing position of the fiber boot, wherein the exit angle is set based on a type of the fiber optic assembly.

20 Claims, 11 Drawing Sheets

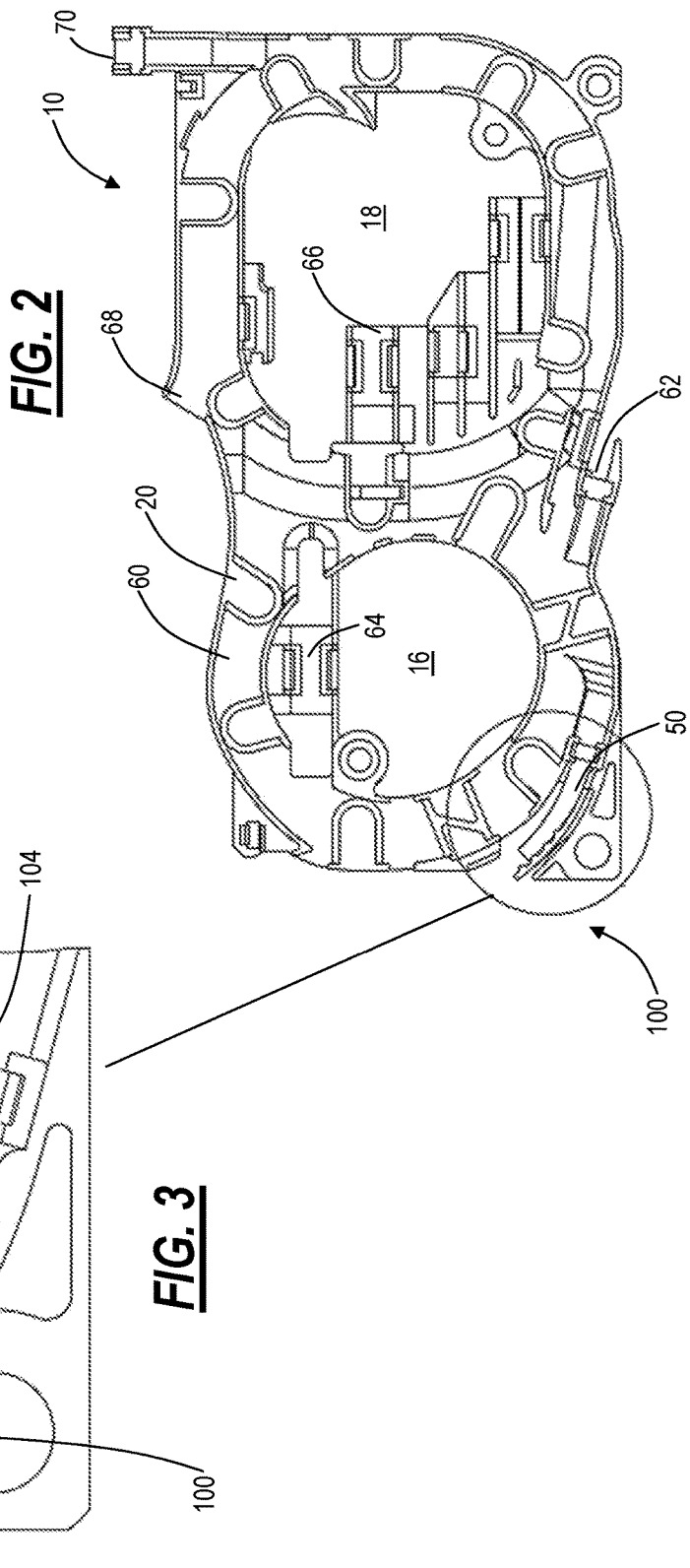

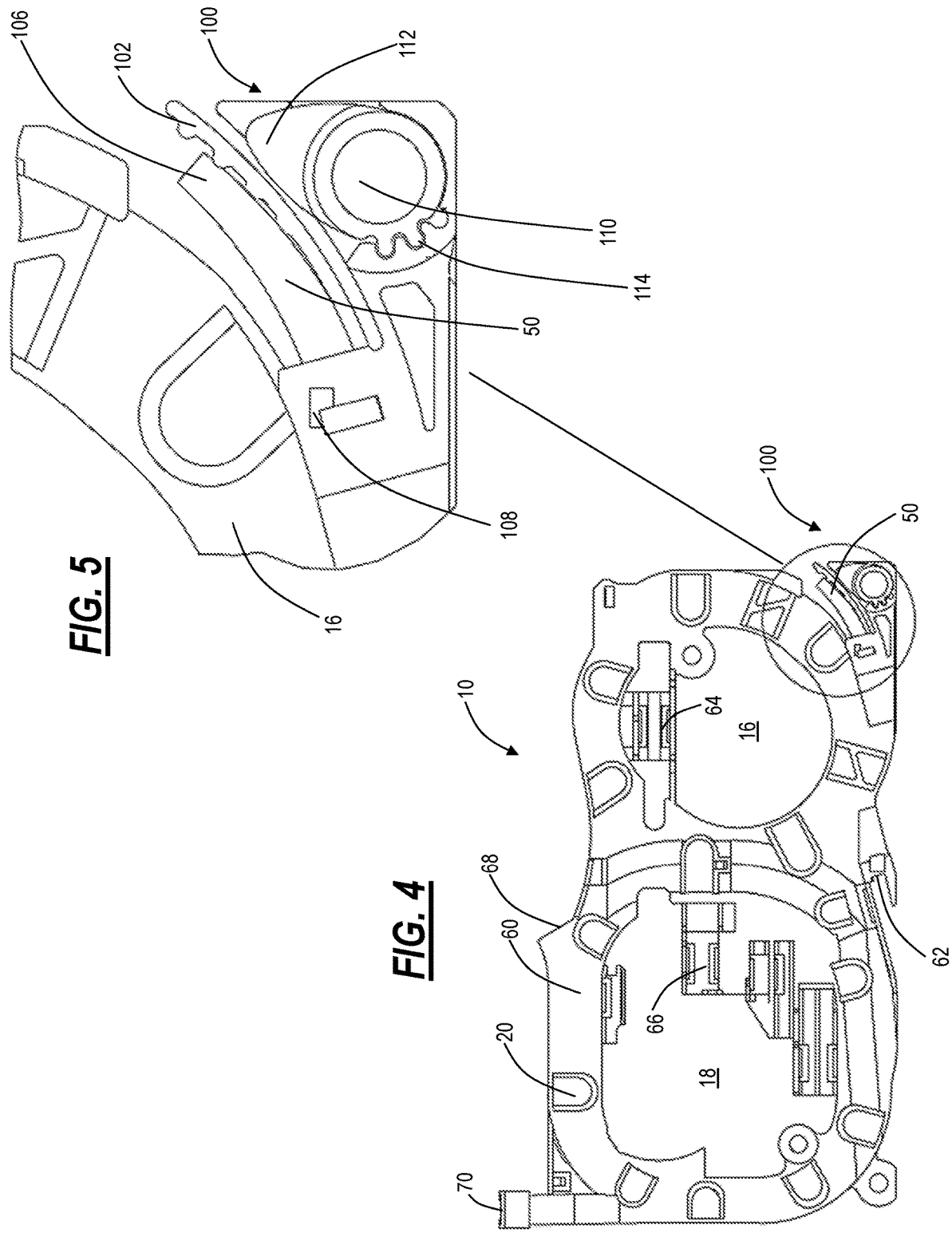

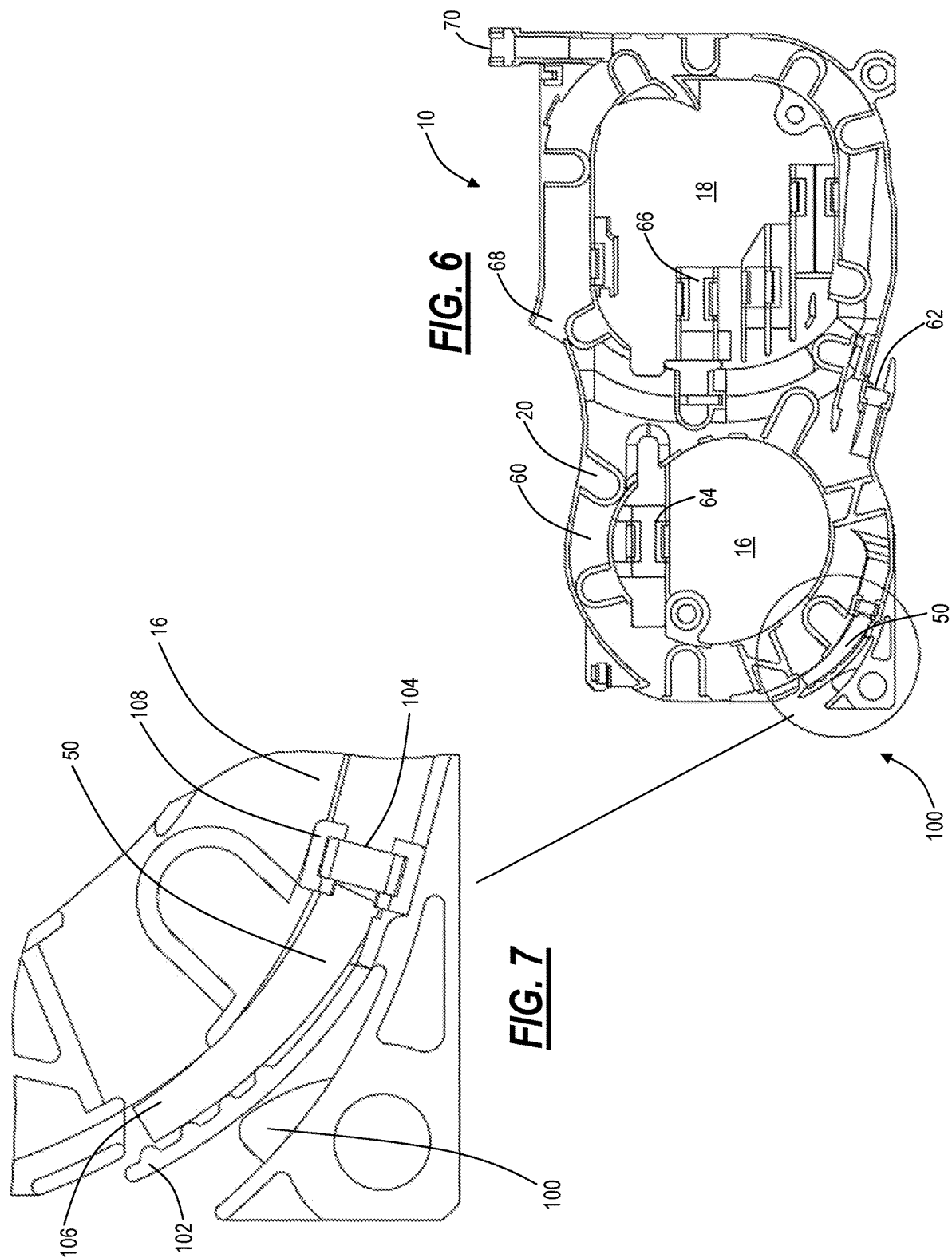

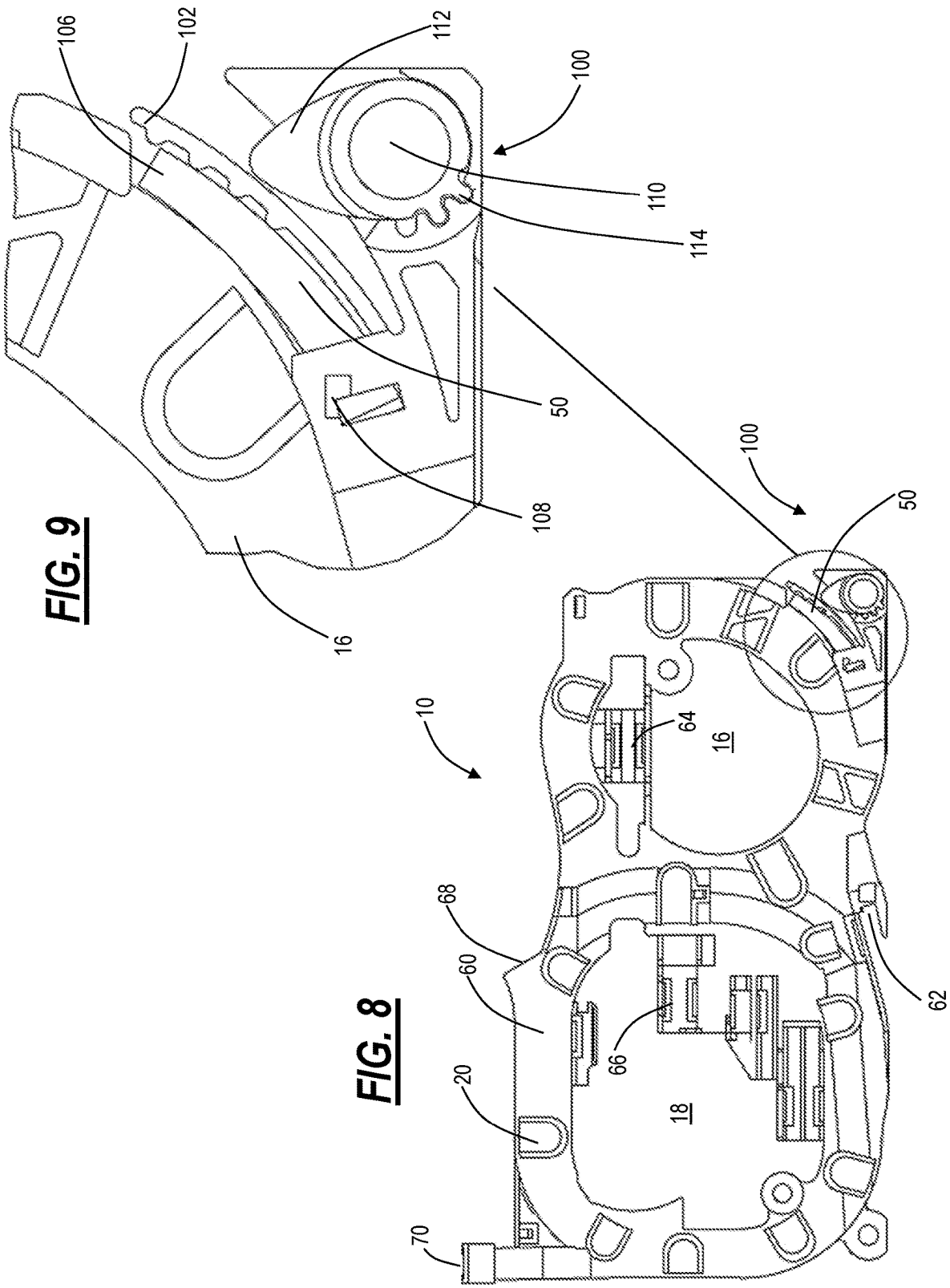

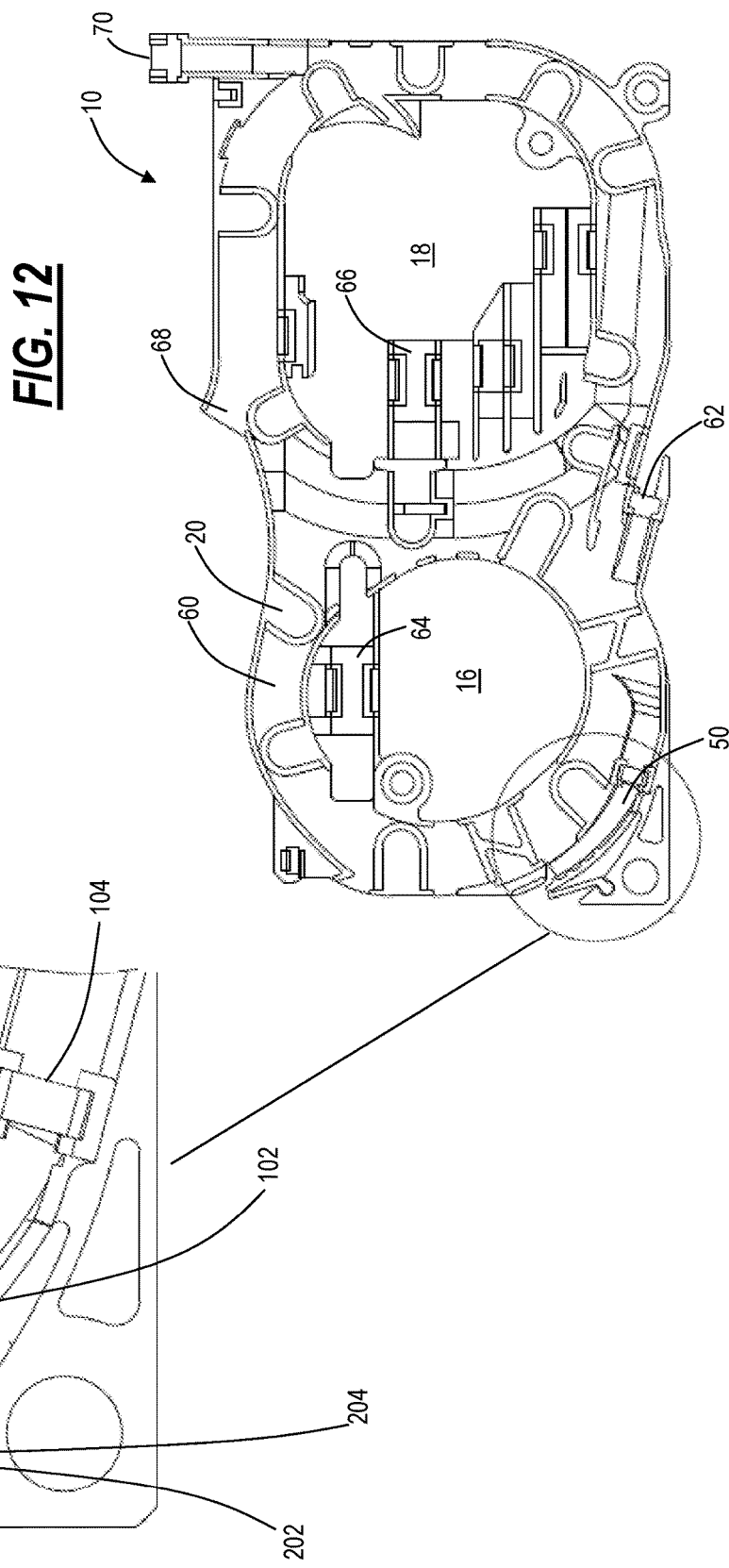

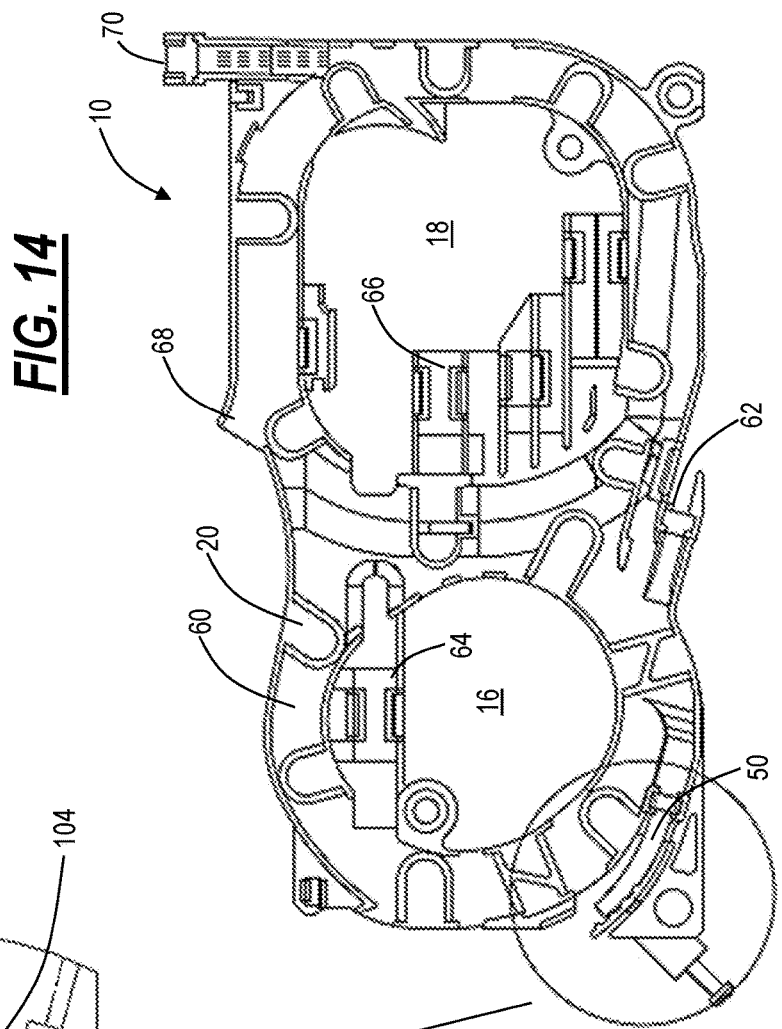
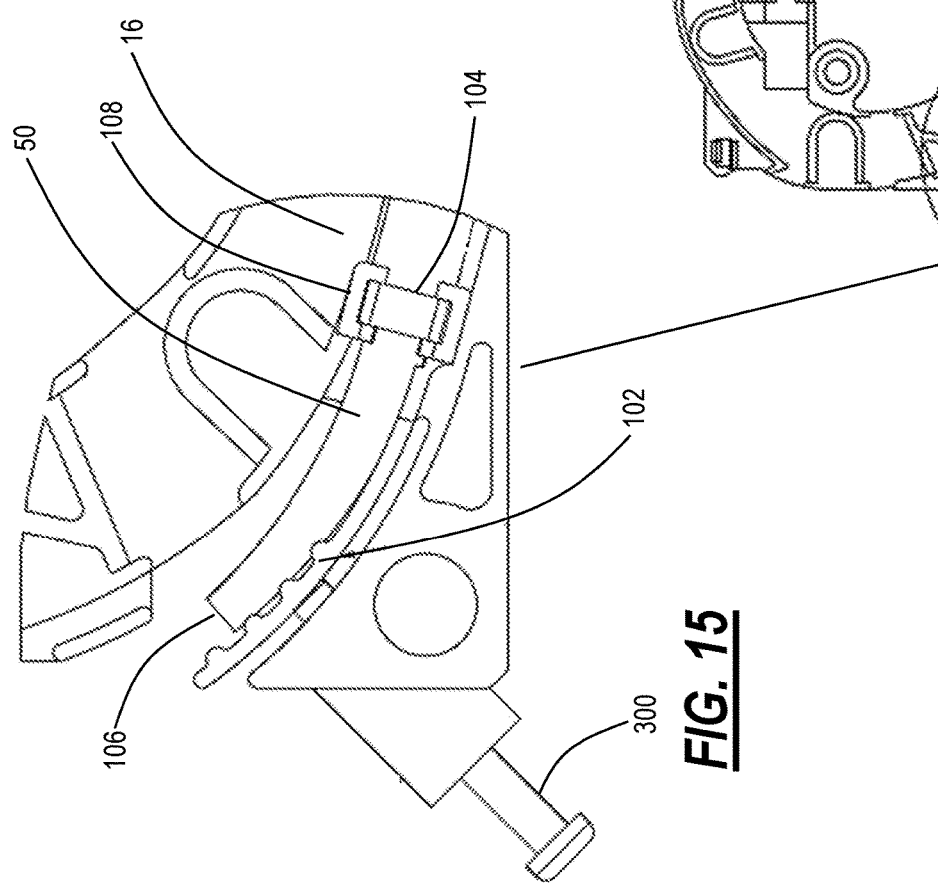
FIG. 14
FIG. 15

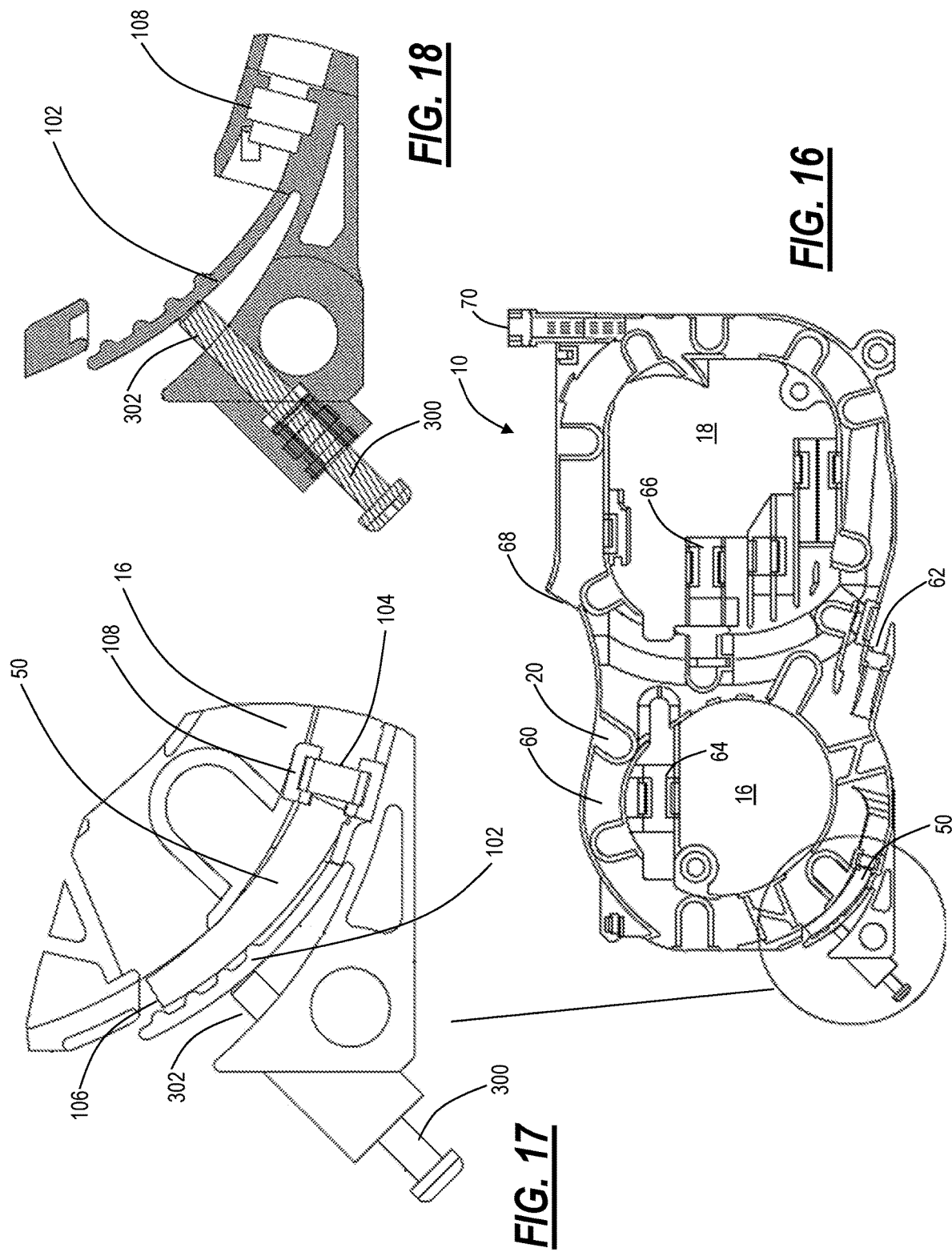

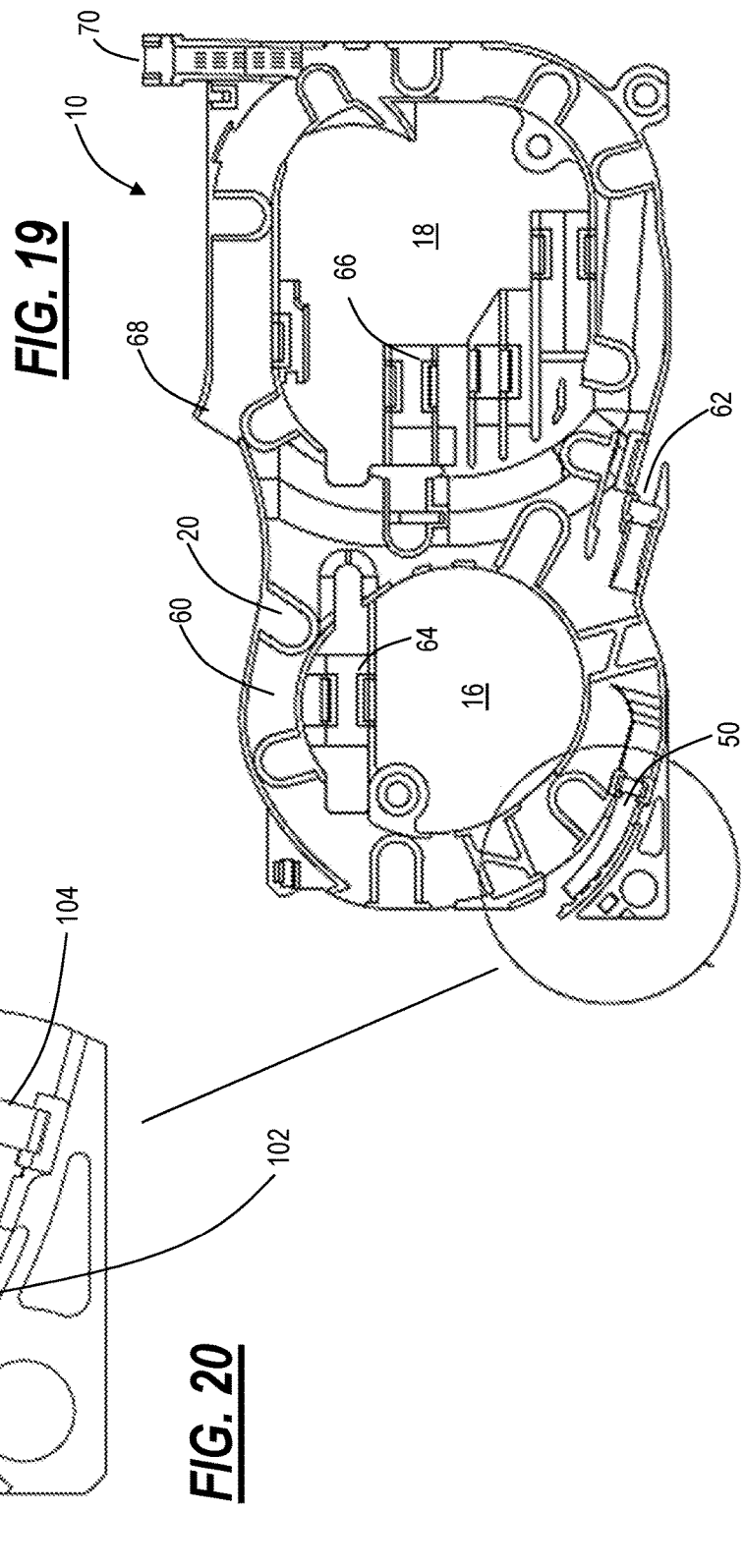

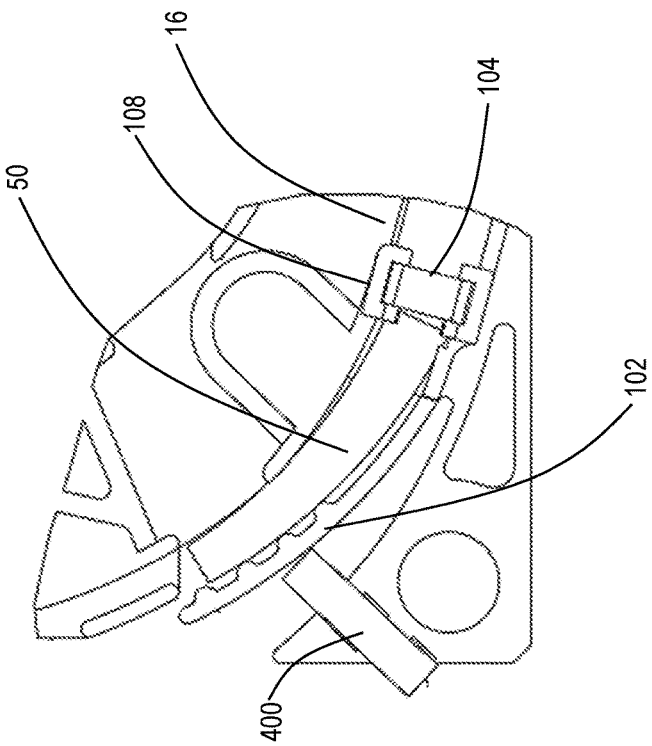
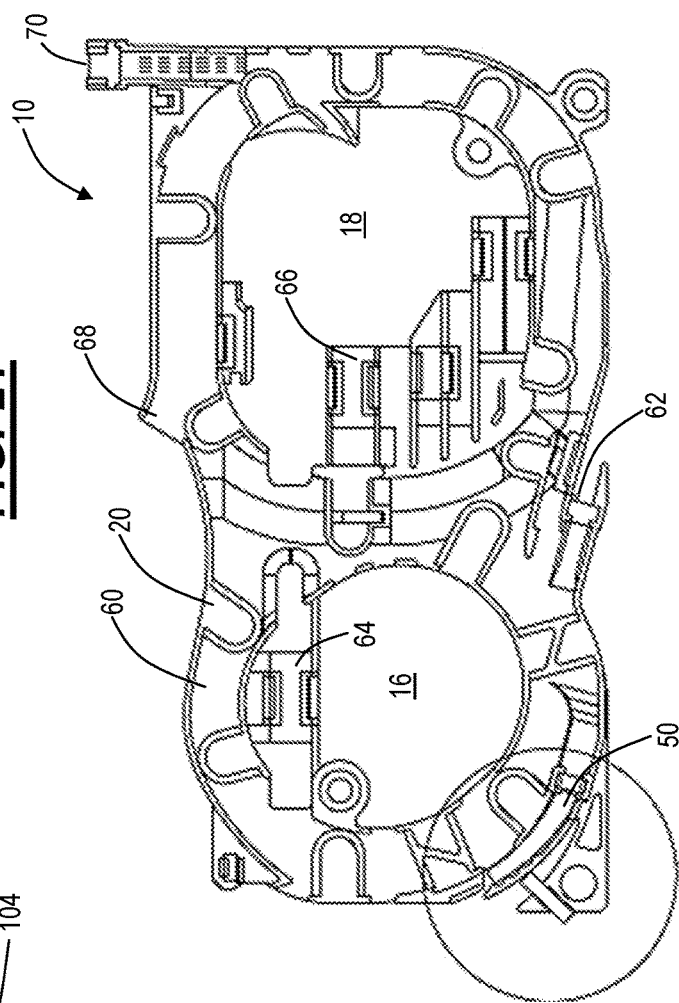
FIG. 23
FIG. 21
FIG. 22

FLEXIBLE ROUTING IN A FIBER TRAY FOR USE IN A FIBER OPTIC ASSEMBLY

FIELD OF THE DISCLOSURE

The present disclosure generally relates to a fiber tray for fiber optic systems. More particularly, the present disclosure relates to flexible routing in a fiber tray for use in a fiber optic assembly.

BACKGROUND OF THE DISCLOSURE

Fiber optic communications utilize optical fiber as a waveguide to transport optical signals between devices. Due to various factors including high bandwidth, fiber optic communication is key in networking and other applications. In networking, for example, devices are realized through hardware components referred to generally as circuit packs, modules, line cards, blades, etc. (generally referred to herein as a fiber optic assembly). The fiber optic assembly can include various electric circuits, optical components, and interconnections therebetween. A key implementation challenge in fiber optic devices is managing optical cables in the physical hardware. To manage fiber slack and maintain appropriate bend radius, fiber trays are used in fiber optic devices to support optical fiber, optical components, and ingress/egress of the optical fiber with the fiber optic device. Typically, a change in fiber exit in different variations of the fiber optic assembly would require different variations of a fiber tray resulting in different part numbers in a database, on assembly Bill of Materials (BOMs), molds for creating the fiber tray, etc. Alternatively, additional fiber trays can be added which route the fiber to the location required for each alternate assembly. Of course, this approach requires additional parts which add complexity and cost to the design.

BRIEF SUMMARY OF THE DISCLOSURE

In an embodiment, a fiber tray with an adjustable fiber boot exit angle includes one or more trays each including a base layer and a retention mechanism for one or more optical fibers at various positions about the base layer, wherein the one or more trays provide management of the one or more optical fibers in a fiber optic assembly; a fiber boot at an exit point of a tray of the one or more trays, wherein the fiber boot provides an exit for the one or more optical fibers from the fiber tray; and an adjustment mechanism configured to adjust an exit angle of the one or more optical fibers by changing position of the fiber boot, wherein the exit angle is set based on a type of the fiber optic assembly. The fiber tray can be utilized in a plurality of different types of fiber optic assemblies with the adjustment mechanism set based on the type of each. The fiber boot can include a first opening fixed at the tray and a second opening at the exit point which is movable based on the adjustment mechanism. The fiber boot can include a pliable material which is moved at the exit point based on the adjustment mechanism. The fiber tray can include a flexible wall attached to the tray and configured to position the fiber boot based on the adjustment mechanism. The adjustment mechanism can include a spacer cam which is set to displace the flexible wall which in turn moves the fiber boot accordingly for the exit angle. The spacer cam can include an elliptical protrusion which displaces the flexible wall based on a rotation of the spacer cam relative to the tray and using a locking mechanism to hold the spacer cam in place. The adjustment mechanism can include a positioning screw which is threaded to a desired depth to position the flexible wall. The adjustment mechanism can include a flexible arm at an end of the flexible wall which is bent to a desired position and snapped into a receptacle in the tray. The adjustment mechanism can include a snap part that fits into snap features on the tray and which displaces the flexible wall based on position.

In another embodiment, a fiber optic assembly with a fiber tray includes a housing including an entry point; and a circuit board with a plurality of components including at least one optical component and with the fiber tray disposed thereon to provide management of one or more optical fibers in the fiber optic assembly between ports on the entry point and the at least one optical component; wherein the fiber tray includes one or more trays each including a base layer and a retention mechanism for the one or more optical fibers at various positions about the base layer; a fiber boot at the entry point, wherein the fiber boot provides an exit for the one or more optical fibers from the fiber tray; and an adjustment mechanism configured to adjust an exit angle of the one or more optical fibers by changing position of the fiber boot, wherein the exit angle is set based on a type of the fiber optic assembly. The fiber tray can be utilized in a plurality of different types of fiber optic assemblies with the adjustment mechanism set based on the type of each. The fiber boot can include a first opening fixed at the tray and a second opening at the entry point which is movable based on the adjustment mechanism. The fiber boot can include a pliable material which is moved at the entry point based on the adjustment mechanism. The fiber optic assembly can further include a flexible wall attached to the tray and configured to position the fiber boot based on the adjustment mechanism. The adjustment mechanism can include a spacer cam which is set to displace the flexible wall which in turn moves the fiber boot accordingly for the exit angle. The adjustment mechanism can include a positioning screw which is threaded to a desired depth to position the flexible wall. The adjustment mechanism can include a flexible arm at an end of the flexible wall which is bent to a desired position and snapped into a receptacle in the tray. The adjustment mechanism can include a snap part that fits into snap features on the tray and which displaces the flexible wall based on position.

In a further embodiment, a method for providing a fiber tray with an adjustable fiber boot exit angle includes providing one or more trays each including a base layer and a retention mechanism for one or more optical fibers at various positions about the base layer, wherein the one or more trays provide management of the one or more optical fibers in a fiber optic assembly; providing a fiber boot at an exit point of a tray of the one or more trays, wherein the fiber boot provides an exit for the one or more optical fibers from the fiber tray; and providing an adjustment mechanism configured to adjust an exit angle of the one or more optical fibers by changing position of the fiber boot, wherein the exit angle is set based on a type of the fiber optic assembly.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a top view of the fiber tray with a spacer cam mechanism in an open position for the fiber boot;

FIG. 3 is a close-up view of the fiber boot from FIG. 2;

FIG. 4 is a bottom view of the fiber tray from FIG. 2 with the spacer cam mechanism in the open position;

FIG. 5 is a close-up view of the fiber boot from FIG. 4;

FIG. 6 is a top view of the fiber tray with the spacer cam mechanism in a closed position for the fiber boot;

FIG. 7 is a close-up view of the fiber boot from FIG. 6;

FIG. 8 is a bottom view of the fiber tray from FIG. 6 with the spacer cam mechanism in the closed position;

FIG. 9 is a close-up view of the fiber boot from FIG. 8.

FIG. 12 is a top view of the fiber tray with the bendable arm in a closed position for the fiber boot;

FIG. 13 is a close-up view of the fiber boot from FIG. 12;

FIG. 14 is a top view of the fiber tray with a positioning screw in an open position for the fiber boot;

FIG. 15 is a close-up view of the fiber boot from FIG. 14;

FIG. 16 is a top view of the fiber tray with the positioning screw in a closed position for the fiber boot;

FIG. 17 is a close-up view of the fiber boot from FIG. 16;

FIG. 18 is a cross-sectional view of FIG. 17;

FIG. 19 is a top view of the fiber tray with a snap part in an open position for the fiber boot;

FIG. 20 is a close-up view of the fiber boot from FIG. 19;

FIG. 21 is a top view of the fiber tray with the snap part in a closed position for the fiber boot;

FIG. 22 is a close-up view of the fiber boot from FIG. 21; and

FIG. 23 is a diagram of a snap part.

DETAILED DESCRIPTION OF THE DISCLOSURE

The present disclosure relates to flexible routing in a fiber tray for use in a fiber optic device. Specifically, the present disclosure includes a fiber tray with a flexible fiber exit where the fiber boot exits the fiber tray. The fiber exit angle is selectable using multiple different mechanisms that push a flexible wall to the desired angle. This aligns the fiber exiting the tray to the position required. This mechanism allows a single fiber tray design to be used in multiple different assemblies which require fiber to be routed to different locations. Multiple exit angles can be defined to "switch" the fiber to a different fiber ramp exit, and even to allow the fiber to be routed above or below the fiber tray without exceeding the fiber bend radius limit. By using a single main fiber tray with a position cam part for multiple variations of a single assembly, the total number of different make parts required is reduced. The selectable fiber tray can be used on more assemblies, increasing volume, and decreasing cost per piece part. BOMs can be managed more easily as different piece parts are not required, saving time, cost, and reducing documentation errors.

The fiber tray can include different mechanisms for adjustment include, without limitation: a spacer cam mechanism that can be rotated to push a flexible wall to a desired angle; a positioning screw that is threaded into a desired depth to position the flexible wall; a snap mate part that fits into snap features on the main fiber tray, which pushes the wall to the desired position; a flexible arm which extends off of the end of the flexible wall which can be bent to the desired position and snapped into receptacles in the fiber tray to select desired flexible wall position; and the like.

Figure 1:
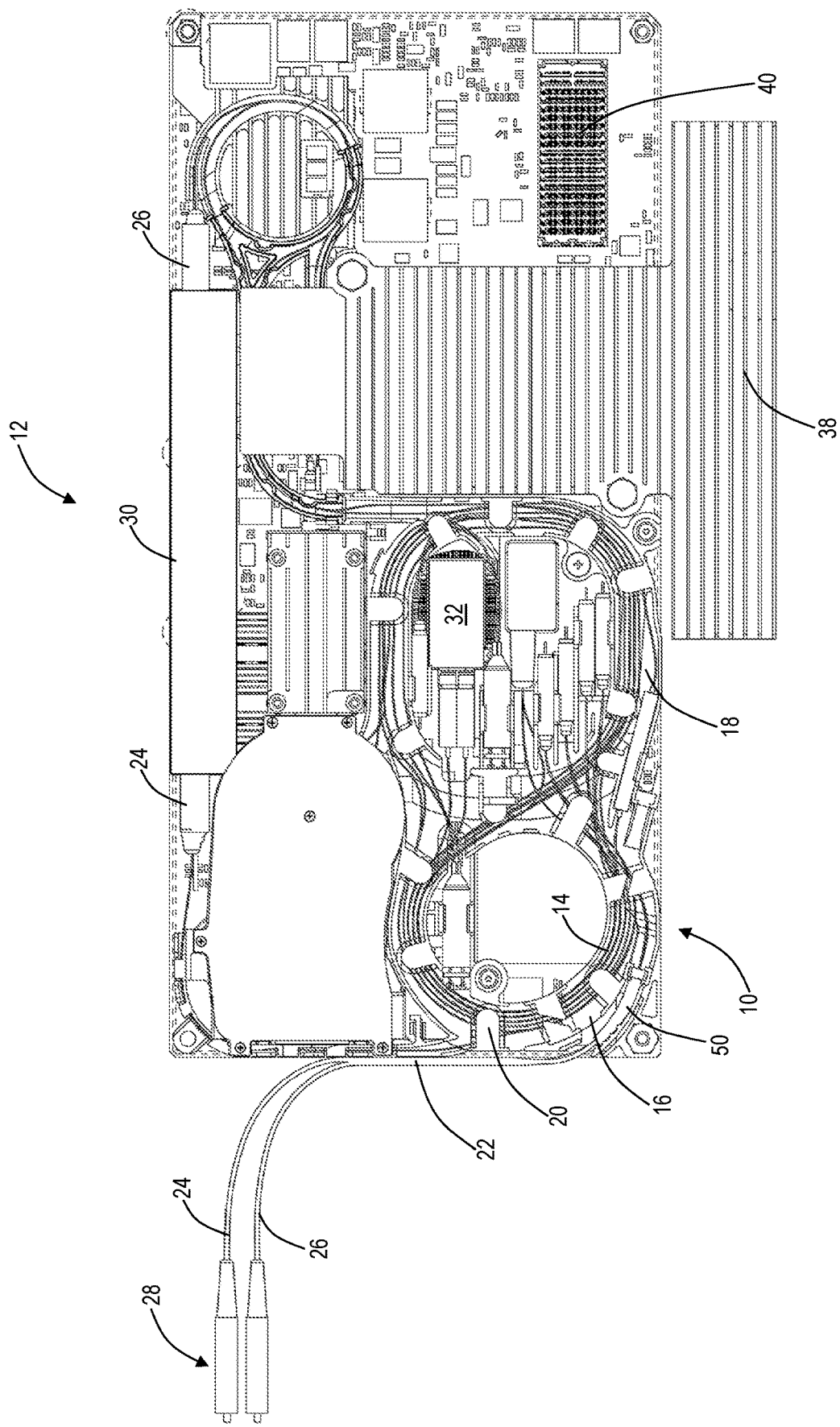
FIG. 1 is a diagram of a fiber tray in a fiber optic assembly.

FIG. 1 is a diagram of a fiber tray 10 in a fiber optic assembly 12. The fiber tray 10 is an assembly which provides fiber routing of optical fibers 14 in the fiber optic assembly 12. In this example, the fiber tray 10 has a lemniscate shape (i.e., an infinity symbol) with two interconnected trays 16, 18 and with various clips 20 spaced apart on the trays 16, 18 to maintain the optical fibers 14 in place. Of note, there can be multiple optical fibers 14 in the fiber optic assembly 12 using the fiber tray 10.

The objective of the fiber tray 10 is to ingress/egress the optical fibers 14 such as at an entry point 22 of the fiber optic assembly 12 and to route the optical fibers 14 with various components in the fiber optic assembly 12. In this example, there are two optical fibers 14 at the entry point 22, such as a transmit (TX) fiber 24 and a receive (RX) fiber 26 for bidirectional communication through the fiber optic assembly 12. For example, the fibers 24, 26 can include connectors 28 such as LC connectors to connect to other fiber optic assemblies, to patch cords, to patch panels, etc. The entry point 22 can be at a faceplate of a module where external fiber connections such as LC connectors are accessible. In another embodiment, the entry point 22 can be the connectors 28 such as when the fiber optic assembly 12 is a daughter card.

The fiber tray 10 is a physical assembly, such as plastic or the like, which provides the functions of the routing of the optical fibers 14 in/out of the fiber optic assembly 12 and to/from various components while concurrently ensuring any slack optical fiber 14 is managed, and the appropriate bend radius is maintained. The minimum bend radius is of particular importance in the handling of optical fibers 14. The minimum bending radius will vary with different cable designs. Beside mechanical destruction, another reason why one should avoid excessive bending of the optical fibers 14 is to minimize microbending and macrobending losses. Microbending causes light attenuation induced by deformation of the optical fiber 14 while macrobending causes the leakage of light through the fiber cladding and this is more likely to happen where the optical fiber 14 is excessively bent.

Again, the fiber optic assembly 12 can be any device which uses fiber optics for connectivity. In this example, the fiber optic assembly 12 is associated with a networking device, e.g., a switch, a router, a Dense Wavelength Division Multiplexing (DWDM) platform, etc. Thus, the fiber optic assembly 12 can be an optical transceiver, an optical amplifier, a switch, an optical power monitor, a Wavelength Selective Switch (WSS), or any other device. In the example of FIG. 1, the fiber optic assembly 12 is a daughter card which is configured to reside on a Printed Circuit Board (PCB) (e.g., the PCB can be the dotted rectangle in FIG. 1) or the like of a module, line card, blade, etc. Those skilled in the art will recognize there are various hardware possibilities all contemplated herein for the fiber optic assembly 12.

In this example, the fiber tray 10 interfaces to the entry point 22, routes the fibers 24, 26 to an optical component 30, and routes the fibers 24, 26 to various intermediate components 32. For example, the optical component 30 can be a Transmit Optical Sub Assembly (TOSA), a Receive Optical Sub Assembly (ROSA), an amplifier gain block, a WSS module, a Dispersion Compensation Module (DCM), or the like. Of note, the optical component 30 includes connectors 34, 36 to interface with the fibers 24, 26. The intermediate components 32 can be in the tray 18 and can include Variable Optical Attenuators (VOAs), filters, isolators, couplers, etc.

Additionally, the fiber optic assembly 12 can include the PCB, but which can be visualized as housing the fiber tray 10, the optical component 30, the intermediate components 32, etc. For example, the fiber optic assembly 12 can include electric circuits (not shown) which are covered with a heat sink 38 as well as other electric circuits 40. In the example of FIG. 1, the fiber optic assembly 12 is a daughter card and the electric circuits 40 can include a mezzanine connector which connects to the main motherboard assembly along with other circuits.

The fiber tray 10 includes a fiber boot 50 which defines an angle of exit for the fibers 24, 26 out of the entry point 22 of the fiber optic assembly. The present disclosure describes various mechanisms for adjustment of the fiber boot 50 to support the same fiber tray 10 for use with different fiber optic assemblies 12 which require different angles for the exit of the fibers 24, 26 out of the entry point. As mentioned, this advantageous introduces configurability in the fiber tray 10 reducing the number of manufactured components streamlining design complexity, cost, etc.

FIGS. 2-23 are various diagrams of the fiber tray 10 and close-up views of the fiber boot 50 with different adjustment mechanisms to change the fiber exit angle. Again, the present disclosure presents four example adjustment mechanisms including a spacer cam mechanism, a positioning screw, a snap mate part, and a flexible arm. FIGS. 2-9 illustrate the spacer cam mechanism. FIGS. 10-13 illustrate the flexible arm. FIGS. 14-18 illustrate the positioning screw. FIGS. 19-23 illustrate the snap mate part.

Again, the fiber tray 10 in FIGS. 2-23 is illustrated with two interconnected trays 16, 18 in a lemniscate shape. Those skilled in the art will recognize the different adjustment mechanisms to change the fiber exit angle could apply to a single tray 16 configuration. Generally, each tray 16, 18 has a circular or substantially circular shape with a base layer 60 which is disposed to the fiber optic assembly 12, e.g., screwed in, etc. and various clips 20 spaced above the base layer 60 and apart along the trays 16, 18 to hold the optical fibers 14 in the fiber tray 10. The clips 20 is one example of a retention mechanism which holds the optical fibers 14 in place in the fiber tray 10. Other mechanical devices can be used for the retention mechanism. The substantially circular shape can be based on a minimum desired bend radius. As described herein, the substantially circular shape can be oval, circle, elliptical, rectangular with rounded edges, etc.

In this example, the tray 16 includes the fiber boot 50 which provides the optical fibers 14 to exit the fiber tray 10, such as via the entry point 22. The tray 16 can include another exit 62 on an opposite side as the fiber boot 50 for the optical fibers 14 to exit the fiber tray 10 into the fiber optic assembly 12. Further, the tray 16 can include a holder 64 connected to the base layer 60 to hold the intermediate components 32. In this example, the tray 16 is interconnected with the tray 18. The tray 18 can include holders 66 on the base for the intermediate components 32 as well as exits 68, 70 for the optical fibers 14 to exit the fiber tray 10 into the fiber optic assembly 12.

The present disclosure provides adjustment mechanisms to change the exit angle of the fiber boot 50 on the tray 16. Those skilled in the art will recognize these adjustment mechanisms can also be used on the exits 62, 68, 70, as well on a single tray configuration (e.g., the tray 16 only). However, for illustration purposes, the foregoing FIGS. 2-23 illustrate the adjustment mechanisms on the fiber boot 50 at the exit of the tray 16 to the entry point 22 of the fiber optic assembly 12.

FIG. 2 is a top view of the fiber tray 10 with a spacer cam mechanism 100 in an open position for the fiber boot 50. FIG. 3 is a close-up view of the fiber boot 50 from FIG. 2. FIG. 4 is a bottom view of the fiber tray 10 from FIG. 2 with the spacer cam mechanism 100 in the open position. FIG. 5 is a close-up view of the fiber boot 50 from FIG. 4. FIG. 6 is a top view of the fiber tray 10 with the spacer cam mechanism 100 in a closed position for the fiber boot 50. FIG. 7 is a close-up view of the fiber boot 50 from FIG. 6. FIG. 8 is a bottom view of the fiber tray 10 from FIG. 6 with the spacer cam mechanism 100 in the closed position. FIG. 9 is a close-up view of the fiber boot 50 from FIG. 8.

With reference to FIGS. 2-9, a spacer cam mechanism 100 can be rotated to push the fiber boot 50 with a flexible wall 102 to the desired angle. The fiber boot 50 is at an exit point in the tray 16 where the optical fibers 14 exit towards the entry point 22 (or equivalent) on the fiber optic assembly. The fiber boot 50 can be a hollow assembly that has two openings 104, 106, i.e., the opening 104 facing the tray 16 and the opening 106 facing the entry point 22. The fiber boot 50 can have a slight curvature as well. The purpose of the fiber boot 50 is to route the optical fibers 14 between the tray 16 and an exit of the fiber tray 10.

The fiber boot 50 can be a pliable material or slightly moveable. Specifically, the fiber boot 50 can be moveable at the opening 106 and fixed in place at the opening 104, such as via base material 108 where the fiber boot 50 can snap or slide in place selectively. The spacer cam mechanism 100 is configured to position the flexible wall 102 at a plurality of locations to change the angle of the fiber boot 50. That is, the flexible wall 102 moves the fiber boot 50 such that the optical fibers 14 exit at a specific angle based on the setting of the spacer cam mechanism 100.

FIGS. 3 and 5 illustrate the spacer cam mechanism 100 at an open position, i.e., one in which the fiber boot 50 is set, based on the position of the flexible wall 102, to exit the optical fibers 14 at a maximum angle relative to the fiber tray 10. FIGS. 7 and 9 illustrate the spacer cam mechanism 100 at a closed position, i.e., one in which the fiber boot 50 is set, based on the position of the flexible wall 102, to exit the optical fibers 14 at a minimum angle relative to the fiber tray 10.

In FIGS. 5 and 9, the space cam mechanism 100 includes a spacer cam 110 which is rotatably connected to the base layer 60 of the fiber tray 10. An elliptical protrusion 112 extends from the spacer cam 110. A circular portion of the spacer cam 110 can include a plurality of keyed protrusions 114 at set angles which can lock the spacer cam 110 in place to displace the flexible wall 102 accordingly. Specifically, the elliptical protrusion 112 can deform the flexible wall 102 moving the fiber boot 50 to different angles. For example, the spacer cam 110 can be lifted off the base layer 60 and placed at different settings of the plurality of keyed protrusions 114.

In this example, the open and the closed positions are the extremes, and there can be multiple intermediate settings for different angles. Those skilled in the art will appreciate there can be various settings, including continuous settings as opposed to set, fixed settings. That is, the plurality of keyed protrusions 114 are one example of a locking mechanism. The spacer cam 110 contemplates any type of locking mechanism. Specifically, the spacer cam 110 with the elliptical protrusion 112 can vary the exit angle at any value between the maximum and minimum angle from the open and closed positions, respectively.

Figure 10:
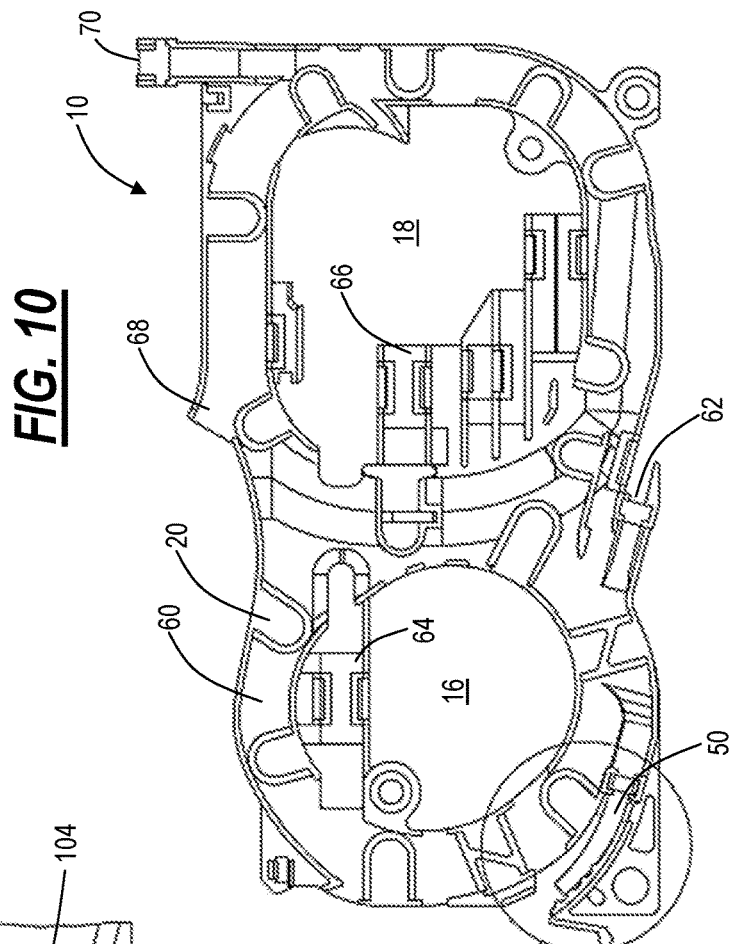
FIG. 10 is a top view of the fiber tray with a bendable arm in an open position for the fiber boot.
Figure 11:
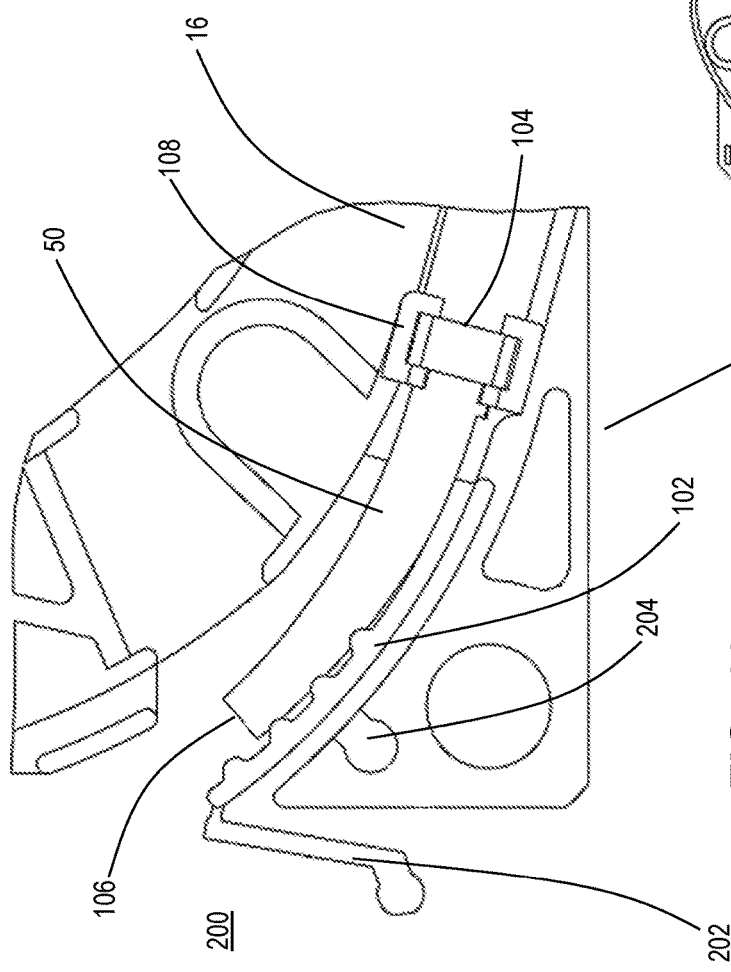
FIG. 11 is a close-up view of the fiber boot from FIG. 10.

FIG. 10 is a top view of the fiber tray 10 with a bendable arm 200 in an open position for the fiber boot 50. FIG. 11 is a close-up view of the fiber boot 50 from FIG. 10. FIG. 12 is a top view of the fiber tray 10 with the bendable arm 200 in a closed position for the fiber boot 50. FIG. 13 is a close-up view of the fiber boot 50 from FIG. 12. The bendable arm 200 approach is similar to the spacer cam mechanism 100 in part, utilizing the flexible wall 102 to displace the fiber boot 50.

Here, a flexible arm 202 extends off of an end of the flexible wall 102. The flexible arm 202 can be bent to the desired position and snapped into a receptacle 204 in the fiber tray 10 to select desired flexible wall 102 position which correspondingly sets the exit angle of the fiber boot 50.

FIG. 14 is a top view of the fiber tray 10 with a positioning screw 300 in an open position for the fiber boot 50. FIG. 15 is a close-up view of the fiber boot 50 from FIG. 14. FIG. 16 is a top view of the fiber tray 10 with the positioning screw 300 in a closed position for the fiber boot 50. FIG. 17 is a close-up view of the fiber boot 50 from FIG. 16. FIG. 18 is a cross-sectional view of FIG. 17. The positioning screw 300 is threaded to the desired depth to position the flexible wall 102. The positioning screw 300 includes an end 302 which deforms the flexible wall 102 based on the threading of the positioning screw 300. The positioning screw 300 can support various different angles to vary the exit angle at any value between the maximum and minimum angle from the open and closed positions.

FIG. 19 is a top view of the fiber tray 10 with a snap part 400 in an open position for the fiber boot 50. FIG. 20 is a close-up view of the fiber boot 50 from FIG. 19. FIG. 21 is a top view of the fiber tray 10 with the snap part 400 in a closed position for the fiber boot 50. FIG. 22 is a close-up view of the fiber boot 50 from FIG. 21. FIG. 23 is a diagram of a snap part 400. The snap part 400 fits into snap features 402 on the fiber tray 10 and based on the position of the snap part 400, the flexible wall 102 is held in the desired position.

In an embodiment, the fiber tray 10 has an adjustable fiber boot exit angle. The fiber tray 10 includes one or more trays 16, 18 each including a base layer 60 in a substantially circular shape and a plurality of clips 20 at various positions about the substantially circular shape, wherein the one or more trays 16, 18 provide management of one or more optical fibers 14 in a fiber optic assembly 12 and the substantially circular shape is set with a minimum bend radius for the one or more optical fibers 14; a fiber boot 50 at an exit point of a tray 16 of the one or more trays 16, 18, wherein the fiber boot 50 provides an exit for the one or more optical fibers 14 from the fiber tray 10; and an adjustment mechanism 100, 200, 300, 400 configured to adjust an exit angle of the one or more optical fibers 14 by changing position of the fiber boot 50, wherein the exit angle is set based on a type of the fiber optic assembly 12.

The fiber tray 10 can be utilized in a plurality of different types of fiber optic assemblies 12 with the adjustment mechanism 100, 200, 300, 400 set based on the type of each. The fiber boot 50 can include a first opening 104 fixed at the tray 16 and a second opening 106 at the exit point which is movable based on the adjustment mechanism 100, 200, 300, 400. The fiber boot 50 can include a pliable material which is moved at the exit point based on the adjustment mechanism 100, 200, 300, 400.

The fiber tray 10 can further include a flexible wall 102 attached to the tray 10 and configured to position the fiber boot 50 based on the adjustment mechanism 100, 200, 300, 400. The adjustment mechanism can include a spacer cam 110 which is set to displace the flexible wall 102 which in turn moves the fiber boot 50 accordingly for the exit angle. The spacer cam 110 can include an elliptical protrusion 112 which displaces the flexible wall 102 based on a rotation of the spacer cam 110 relative to the tray 16 and using a locking mechanism 114 to hold the spacer cam 110 in place.

The adjustment mechanism can include a positioning screw 300 which is threaded to the desired depth to position the flexible wall 102. The adjustment mechanism can include a flexible arm 202 at an end of the flexible wall 102 which is bent to the desired position and snapped into a receptacle 204 in the tray 16. The adjustment mechanism can include a snap part 400 that fits into snap features 402 on the tray and which displaces the flexible wall 102 based on position.

In another embodiment, a fiber optic assembly 12 with a fiber tray 10 includes a housing including an entry point 22; and a circuit board with a plurality of components 30, 32, 40 including at least one optical component 30, 32 and with the fiber tray 10 disposed thereon to provide management of one or more optical fibers 14 in the fiber optic assembly 12 between ports on the entry point 22 and the at least one optical component 30, 32.

In a further embodiment, a process for providing a fiber tray with an adjustable fiber boot exit angle includes providing one or more trays each including a base layer in a substantially circular shape and a plurality of clips at various positions about the substantially circular shape, wherein the one or more trays provide management of one or more optical fibers in a fiber optic assembly and the substantially circular shape is set with a minimum bend radius for the one or more optical fibers; providing a fiber boot at an exit point of a tray of the one or more trays, wherein the fiber boot provides an exit for the one or more optical fibers from the fiber tray; and providing an adjustment mechanism configured to adjust an exit angle of the one or more optical fibers by changing position of the fiber boot, wherein the exit angle is set based on a type of the fiber optic assembly.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A fiber tray with an adjustable fiber boot exit angle, the fiber tray comprising:
   one or more trays each comprising a base layer and a retention mechanism for one or more optical fibers at various positions about the base layer, wherein the one or more trays provide management of the one or more optical fibers in a fiber optic assembly;
   a fiber boot at an exit point of a tray of the one or more trays, wherein the fiber boot provides an exit for the one or more optical fibers from the fiber tray;
   an adjustment mechanism configured to adjust an exit angle of the one or more optical fibers by changing position of the fiber boot, wherein the exit angle is set based on a type of the fiber optic assembly; and
   a flexible wall attached to the tray and configured to position the fiber boot based on the adjustment mechanism.

2. The fiber tray of claim 1, wherein the fiber tray is utilized in a plurality of different types of fiber optic assemblies with the adjustment mechanism set based on the type of each.

3. The fiber tray of claim 1, wherein the fiber boot comprises a first opening fixed at the tray and a second opening at the exit point which is movable based on the adjustment mechanism.

4. The fiber tray of claim 3, wherein the fiber boot comprises a pliable material which is moved at the exit point based on the adjustment mechanism.

5. The fiber tray of claim 1, wherein the adjustment mechanism comprises a spacer cam which is set to displace the flexible wall which in turn moves the fiber boot accordingly for the exit angle.

6. The fiber tray of claim 5, wherein the spacer cam comprises an elliptical protrusion which displaces the flexible wall based on a rotation of the spacer cam relative to the tray and using a locking mechanism to hold the spacer cam in place.

7. The fiber tray of claim 1, wherein the adjustment mechanism comprises a positioning screw which is threaded to a desired depth to position the flexible wall.

8. The fiber tray of claim 1, wherein the adjustment mechanism comprises a flexible arm at an end of the flexible wall which is bent to a desired position and snapped into a receptacle in the tray.

9. The fiber tray of claim 1, wherein the adjustment mechanism comprises a snap part that fits into snap features on the tray and which displaces the flexible wall based on position.

10. A fiber optic assembly with a fiber tray, the fiber optic assembly comprising:
    a housing comprising an entry point; and
    a circuit board with a plurality of components comprising at least one optical component and with the fiber tray disposed thereon to provide management of one or more optical fibers in the fiber optic assembly between ports on the entry point and the at least one optical component;
    wherein the fiber tray comprises
        one or more trays each comprising a base layer and a retention mechanism for the one or more optical fibers at various positions about the base layer;
        a fiber boot at the entry point, wherein the fiber boot provides an exit for the one or more optical fibers from the fiber tray;
        an adjustment mechanism configured to adjust an exit angle of the one or more optical fibers by changing position of the fiber boot, wherein the exit angle is set based on a type of the fiber optic assembly; and
        a flexible wall attached to the tray and configured to position the fiber boot based on the adjustment mechanism.

11. The fiber optic assembly of claim 10, wherein the fiber tray is utilized in a plurality of different types of fiber optic assemblies with the adjustment mechanism set based on the type of each.

12. The fiber optic assembly of claim 10, wherein the fiber boot comprises a first opening fixed at the tray and a second opening at the entry point which is movable based on the adjustment mechanism.

13. The fiber optic assembly of claim 12, wherein the fiber boot comprises a pliable material which is moved at the entry point based on the adjustment mechanism.

14. The fiber optic assembly of claim 10, wherein the adjustment mechanism comprises a spacer cam which is set to displace the flexible wall which in turn moves the fiber boot accordingly for the exit angle.

15. The fiber optic assembly of claim 10, wherein the adjustment mechanism comprises a positioning screw which is threaded to a desired depth to position the flexible wall.

16. The fiber optic assembly of claim 10, wherein the adjustment mechanism comprises a flexible arm at an end of the flexible wall which is bent to a desired position and snapped into a receptacle in the tray.

17. The fiber optic assembly of claim 10, wherein the adjustment mechanism comprises a snap part that fits into snap features on the tray and which displaces the flexible wall based on position.

18. A method for providing a fiber tray with an adjustable fiber boot exit angle, the method comprising:
    providing one or more trays each comprising a base layer and a retention mechanism for one or more optical fibers at various positions about the base layer, wherein the one or more trays provide management of the one or more optical fibers in a fiber optic assembly;
    providing a fiber boot at an exit point of a tray of the one or more trays, wherein the fiber boot provides an exit for the one or more optical fibers from the fiber tray;
    providing an adjustment mechanism configured to adjust an exit angle of the one or more optical fibers by changing position of the fiber boot, wherein the exit angle is set based on a type of the fiber optic assembly; and
    providing a flexible wall attached to the tray and configured to position the fiber boot based on the adjustment mechanism.

19. The method of claim 18, wherein the fiber tray is utilized in a plurality of different types of fiber optic assemblies with the adjustment mechanism set based on the type of each.

20. The method of claim 18, wherein the fiber boot comprises a first opening fixed at the tray and a second opening at the exit point which is movable based on the adjustment mechanism.

* * * * *